METHOD OF MAKING AN ELECTRICAL COMPONENT

Original Filed Oct. 3, 1963

INVENTOR.
John C. Manley
BY Walter S. Zebrowski
ATTORNEY

United States Patent Office 3,452,432
Patented July 1, 1969

3,452,432
METHOD OF MAKING AN ELECTRICAL COMPONENT

John C. Manley, Bradford, Pa., assignor to Corning Glass Works, Corning, N.Y., a corporation of New York
Original application Oct. 3, 1963, Ser. No. 313,513, now Patent No. 3,305,821, dated Feb. 21, 1967. Divided and this application Apr. 27, 1966, Ser. No. 545,746
Int. Cl. H01c *1/14*
U.S. Cl. 29—621 3 Claims This application is a division of application Ser. No. 313,513, filed Oct. 3, 1963, now Patent No. 3,305,821 granted Feb. 21, 1967.

This invention relates to electrical components and to the method of making the same. More particularly this invention relates to impedance devices and to a method of fabricating and encapsulating or hermetically sealing them, but is in no way limited thereto.

Impedance devices, such as resistors, capacitors, or inductors are usually encapsulated to provide the element with a thermal barrier, or to protect the element from attack by excessive moisture or damage by corrosion, or to perform the function of electrically insulating the element from adjacent elements, or in certain applications, all these functions may be served.

For purposes of simplicity, the novel process and the product of this invention will be described in terms of an encapsulated resistor, the preferred embodiment; however, it is not intended that this invention be so limited.

The prior art methods of forming resistors and encapsulating them, fall into three general categories, the first of which is a potting method whereby the resistance element is coated with a fluid or semifluid dielectric potting material, and is subsequently allowed to harden about the body of the element to provide the necessary protective coating. Another method is one where the resistance element is hermetically sealed in a container that may be either evacuated or filled with an inert atmosphere. The third method is one where a glass or like material sleeve is disposed about the resistance element and thereafter shrunk by various means to form an adherent coating thereon.

Any of these methods have serious drawbacks particularly where small, precision, close tolerance low ohmic resistance elements are required, in that they are expensive; require caps to make electrical connection between the leads and resistance element, which caps cause bulges and irregular shapes, trap air beneath the coating, and provide a weak connection between the lead and the resistance element; are subject to resistance variations as a result of high temperature fabrication and encapsulation; are not suitable for forming resistors the element of which is not substantially larger than the lead; and have other disadvantages.

It is an object of this invention to provide a low cost hermetically sealed resistor.

Another object of the present invention is to provide a hermetically sealed resistor noted by its high order of accuracy, reproducibility, and relatively high selection rate.

Another object is to provide a hermetically sealed resistor that is noted by its ease of manufacture.

A further object is to provide a hermetically sealed resistor that is noted by its bond strength between the resistor leads and the resistor element.

Broadly, according to the invention, an electrical impedance device is fabricated and encapsulated by providing an impedance element, disposing a pair of leads adjacent the ends of said element along the longitudinal axis thereof, spinning said element and said leads about said longitudinal axis, applying conductive material to each junction of said element and said leads, and spraying molten glass to said element and a portion of said leads to form a continuous adherent impervious coating whereby said coating maintains said leads in electrical contact with said element through said conductive material.

Additional objects, features, and advantages of the present invention will become apparent, to those skilled in the art, from the following detailed description and the attached drawing on which, by way of example, only the preferred embodiments of this invention are illustrated.

Figure 1:
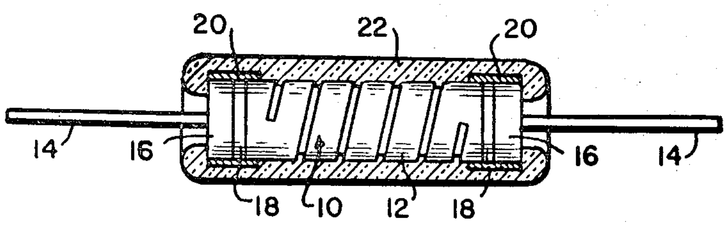
FIGURE 1 is a cross sectional elevation of a typical finished resistor formed in accordance with this invention.

Referring now to FIGURE 1, there is shown a resistor element 10 comprising a solid dielectric substrate, upon the surface of which an electroconductive film 12 of metallic oxide or the like is deposited. For a clear understanding of film 12, its characteristics, and one example of its application, reference is made to U.S. Patent Nos. 2,564,706 and 2,564,707, issued to John M. Mochel. The electroconductive film 12 may be spiralled to provide desired electrical characteristics.

Resistor leads 14 are provided with suitable element contacting ends such as discs 16, to which discs a layer 18 of suitable bonding material is applied. As hereinafter used, the term lead will mean the lead with a disc and bonding material, if any, adhered thereto. The resistor element may be formed of a dielectric substrate, such as glass or the like, in the form of a cylinder, prism, or the like, upon which, said electroconductive film is deposited. The bonding material of layer 18 may be a thin film of glass adhered to the disc and thereafter fused to the resistor element.

Electrical continuity between the resistor element and leads 14 is obtained by applying a continuous band 20 of conductive material over each end of blank 10 and the edges of disc 16. Such conductive material may be a silver frit in a suitable vehicle or binder, sprayed molten silver or the like. One familiar with the art can readily select a suitable conductive material.

Resistor element 10 and a portion of said leads are hermetically sealed by coating 22 which comprises an impervious dielectric material such as glass. The composition of the glass coating is not critical so long as it is a dielectric, is impervious, and is compatible with the resistor element and leads. One familiar with the art can readily select a suitable coating material, a bonding material and a substrate material.

Coating 22 is applied by plasma jet means in the form of molten particles which are caused to impinge on the surface of element 10. To prevent resistance variations or drift during fabrication and encapsulation, said coating 22 must be applied rapidly and uniformly. Accordingly, said resistor element and said leads are caused to spin about the longitudinal axis thereof while said molten particles impinge on said surface. Said particles remain in molten form until they flow together to form a thin continuous coating 22. Sufficient heat is transferred from the molten particles to fuse the conductive material bands 20 to said element and said discs, and also to fuse glass layer 18, if any, to he substrate of element 10, or to fuse said disc directly to said element.

Suitable plasma jet means and a method of introducing powdered encapsulating material into a plasma stream are described in U.S. Patent No. 3,174,025, issued to Robert M. Johnson, the specification of which patent is incorporated herein by reference.

It has been found that a resistor fabricated in accordance with the method of this invention, as hereinabove outlined, has a smooth surface, is free from entrapped air beneath the coating, is readily reproducible, has a high selection rate, has an exceptionally high bond strength between the leads and the resistor element, and has many other advantages.

Figure 2:
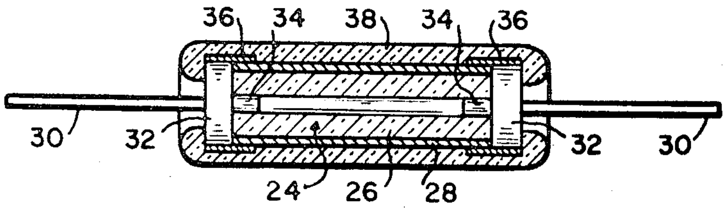
FIGURE 2 is a cross sectional elevation of a resistor illustrating another embodiment of this invention.

FIGURE 2 illustrates another embodiment of this invention. Resistor element 24 is formed of a tubular substrate 26 to which is applied an electroconductive film 28, as heretofore described. Leads 30 are formed with discs 32 to which discs and substantially concentrically therewith, pins 34 are affixed. Pins 34 are made of a diameter substantially the same as the diameter of the internal bore of tubular substrate 26. Therefore, when leads 30 are assembled with element 24, pins 34 are inserted in said bore resulting in a strong, rigid structure. Bands 36 of conductive material are applied to the junction between element 24 and discs 32, and coating 38 is then applied as heretofore described in connection with FIGURE 1.

Figure 3:
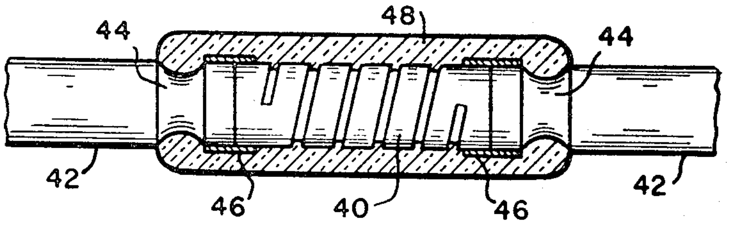
FIGURE 3 is a cross sectional elevation of a resistor illustrating saill another embodiment of this invention.

Referring now to FIGURE 3, it is seen that when a resistor element 40 has a diameter so small that it approaches the diameter of the leads, it may be readily encapsulated by the method of this invention. Leads 42 may be caused to be formed with groove 44 about one end thereof. Band 46 of conductive material may then be applied to the ends of blank 40 extending over a portion of lead 42 adjacent blank 40 to provide electrical continuity therebetween. A coating 48 may be applied, as heretofore described, extending from groove 44 of one of said leads over element 40 to groove 44 of the other of said leads. When coating 48 solidifies, it contracts and is in compression thereby holding leads 42 firmly against the ends of element 40.

Figure 4:
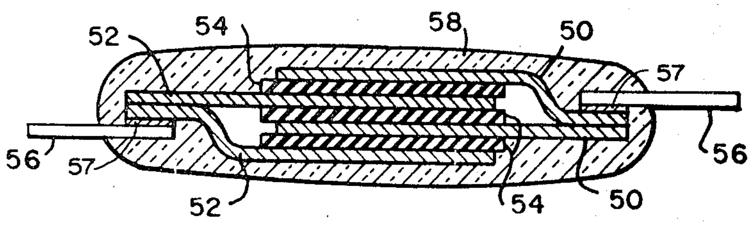
FIGURE 4 is a cross sectional elevation of a capacitor formed in accordance with this invention.

Referring to FIGURE 4, it is seen that a stacked capacitor, having plates 50 and 52 separated by layers of dielectric material 54 and having leads 56 and conductive material 57, may be encapsulated by applying coating 58 thereto in accordance with this invention as heretofore described.

Figure 5:
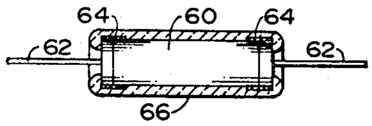
FIGURE 5 is a cross sectional elevation of an inductor formed in accordance with this invention.
Figure 6:
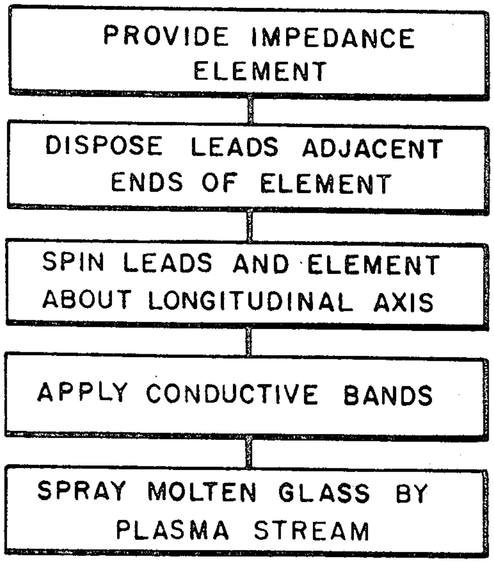
FIGURE 6 is a flow diagram illustrating the various steps of the method of this invention.

Referring to FIGURE 5, it is seen that an inductor 60 having leads 62 and bands 64 of conductive material, may be encapsulated by applying coating 66 thereto in accordance with this invention as heretofore described.

Although the present invention has been described with respect to specific details of certain embodiments thereof, it is not intended that such details be limitations upon the scope of the invention except insofar as set forth in the following claims.

I claim:

1. The method of making an electrical resistor comprising the steps of:

(a) providing a substantially cylindrical resistance element, (b) providing a pair of leads each having a layer of glass adhered to one end thereof, (c) disposing said leads with the layers of glass adjacent the ends of said element along the longitudinal axis thereof, (d) spinning said element and said leads about said longitudinal axis, (e) applying conductive material to each junction of said element and said leads, (f) providing a plasma stream, (g) feeding powdered glass into said plasma stream causing the glass particles to become molten, (h) directing said plasma stream with the molten glass particles to said element and a portion of said leads causing said molten particles to impinge thereon forming a uniform continuous impervious coating, said molten particles transferring sufficient heat through said leads to fuse said layers of glass to said element, and (i) cooling said coating.

(2) A method of making an electrical resistor comprising the steps of:

(a) providing a substantially cylindrical resistance element, (b) disposing a pair of leads adjacent the ends of said element along the longitudinal axis thereof, (c) spinning said element and said leads about said longitudinal axis, (d) applying conductive material to each junction of said element and said leads, (e) providing a plasma stream, (f) feeding powdered glass into said plasma stream causing the glass particles to become molten, (g) directing said plasma stream with the molten glass particles to said element and a portion of said leads causing said molten particles to impinge thereon forming a uniform continuous impervious coating, and (h) cooling said coating, whereby said coating maintains said leads in electrical contact with said element.

3. The method of making an electrical impedance device comprising the steps of:

(a) providing an impedance element, (b) disposing a pair of leads adjacent the ends of said element along the longitudinal axis thereof, (c) spinning said element and said leads about said longitudinal axis, (d) applying conductive material to each junction of said element and said leads, (e) spraying molten glass to said element and a portion of said leads to form a continuous adherent impervious coating, and (f) cooling said coating, whereby said coating maintains said leads in electrical contact with said element.

References Cited

UNITED STATES PATENTS

| | | | |
|---|---|---|---|
| 2,930,018 | 3/1960 | Hinkle | 338—237 |
| 3,083,445 | 4/1963 | Hill | 29—610 |
| 3,170,813 | 2/1965 | Duncan et al. | 117—93.1 X |
| 3,197,335 | 7/1965 | Leszynski | 29—610 X |
| 3,307,134 | 2/1967 | Griest | 338—237 |
| 3,325,303 | 6/1967 | Lant et al. | 117—105.2 X |

JOHN F. CAMPBELL, *Primary Examiner.*

JOHN CLINE, *Assistant Examiner.*

U.S. Cl. X.R.

29—628; 117—93.1, 215